Figure 1:
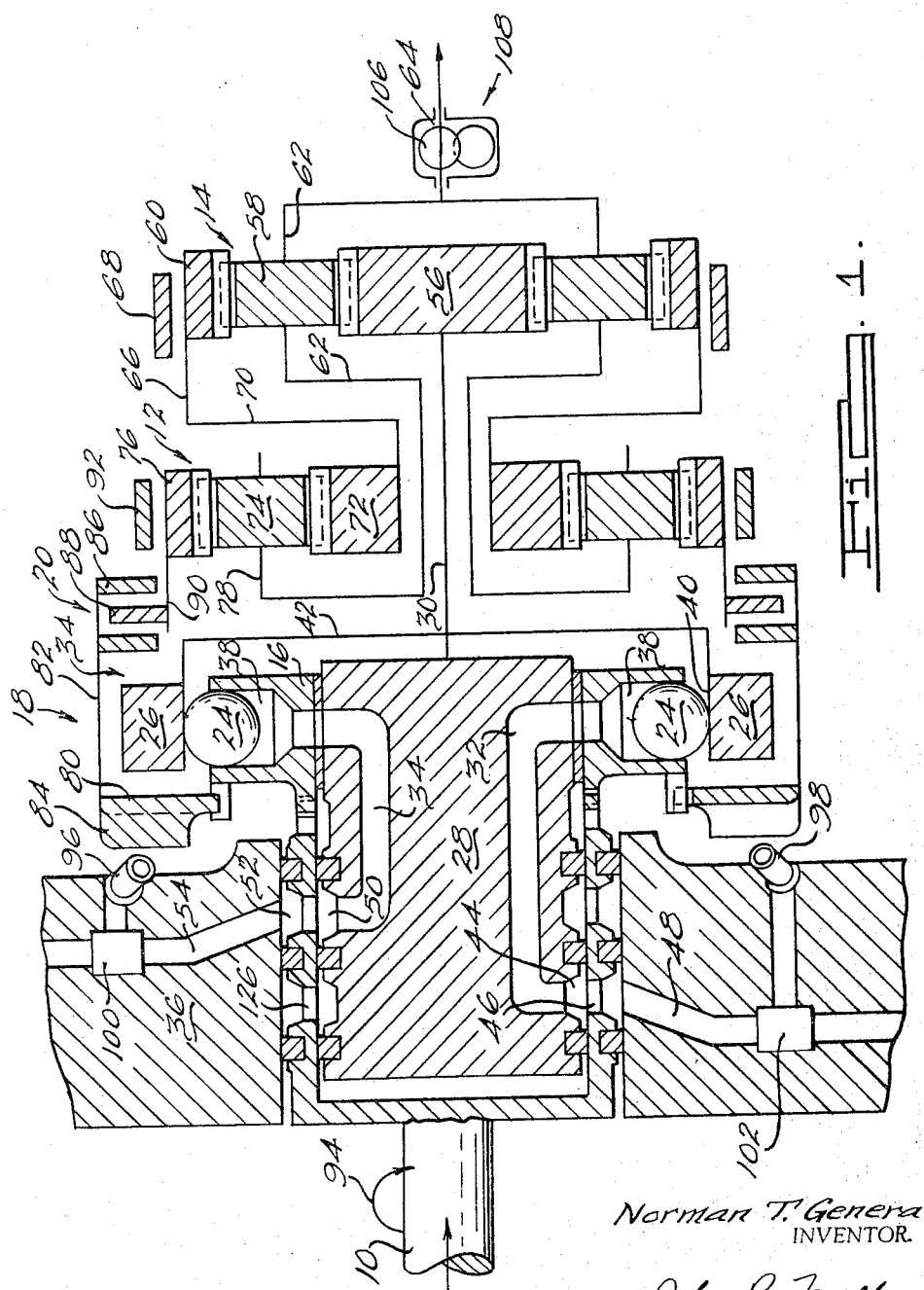

Jan. 24, 1967 N. T. GENERAL 3,299,742
TRANSMISSION

Filed Dec. 30, 1963 2 Sheets-Sheet 1

Norman T. General.
INVENTOR.

BY John R. Faulkner
Robert E. McCollum
ATTORNEYS.

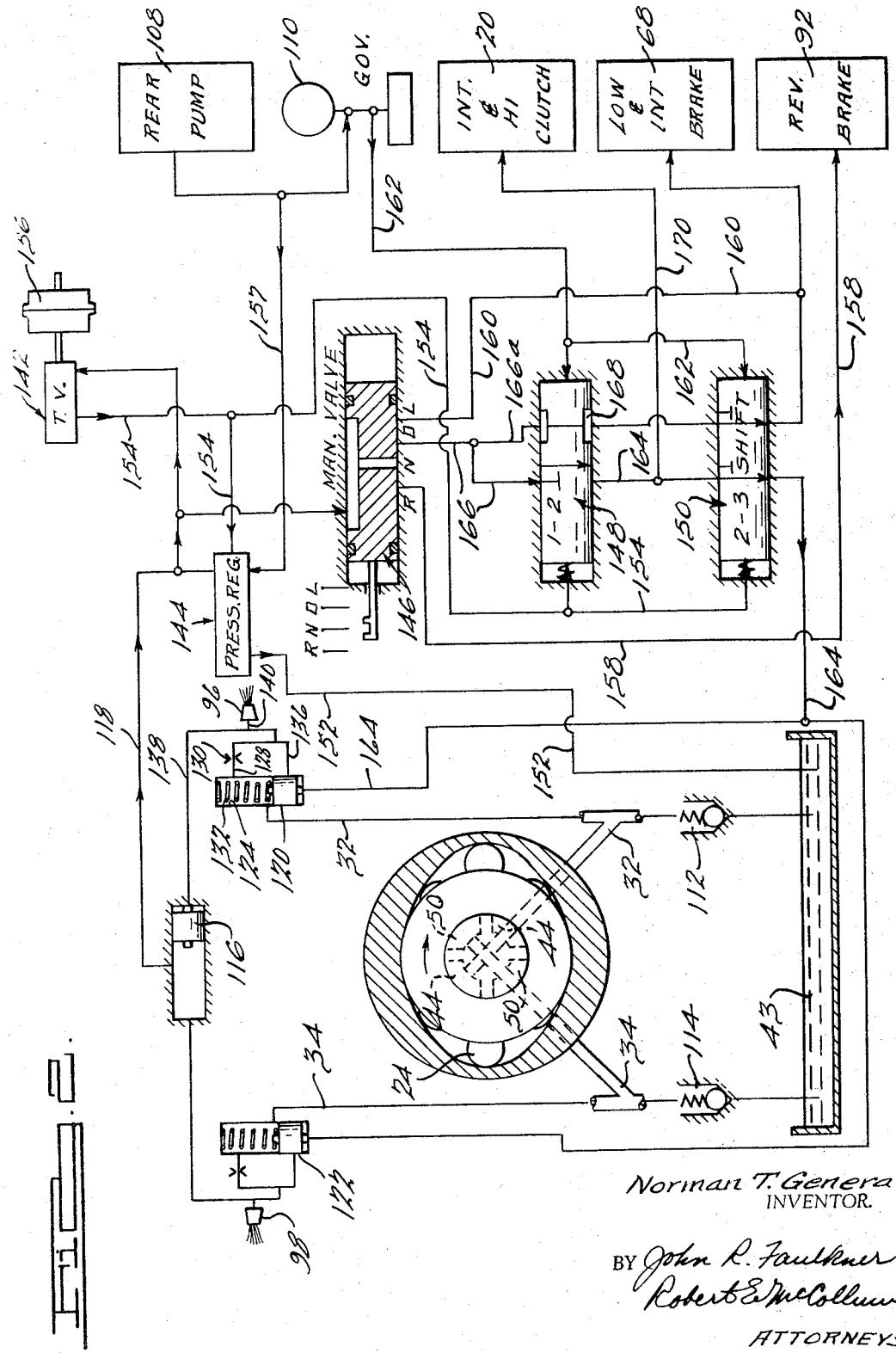

United States Patent Office 3,299,742
Patented Jan. 24, 1967

3,299,742
TRANSMISSION
Norman T. General, Orchard Lake, Mich., assignor to Ford Motor Company, Dearborn, Mich., a corporation of Delaware
Filed Dec. 30, 1963, Ser. No. 334,200
6 Claims. (Cl. 74—687)

This invention relates to a transmission, and more particularly to one of the type shown and described in my copending U.S. application Ser. No. 278,567, entitled "Transmission," filed May 7, 1963, of which the present case is a continuation-in-part. In that application, the transmission consists of a plurality of interconnected planetary gearsets selectively controlled by means of a hydrostatic fluid pump. The pump has a fluid discharge passage that can be opened or blocked and is connected to the gearsets so that blockage of the fluid outlet transmits a drive from the power input shaft to the gearsets, while unblocking the outlet terminates the drive. A control pressure is provided at all times for actuation of the various fluid pressure actuated clutches and bands to condition the gearsets for the respective drives.

The present invention relates to an apparatus for increasing the efficiency of a transmission of the type described. It does this by utilizing the fluid output developed by the pump of the type described to augment the input torque to the transmission. That is, it provides an apparatus for supplementing the drive of the power input member by utilizing the flow of fluid from the pump that otherwise is normally wasted or is used only to satisfy the control system requirements.

More specifically, the invention provides fluid nozzles positioned in the fluid discharge lines of a reversible hydrostatic type pump, the nozzles directing the fluid against blading secured to a rotatable member of the transmission; thus, regardless of the direction of torque flow through the transmission, an auxiliary driving a braking torque, as the case may be, will be imparted to the member.

One of the objects of the invention, therefore, is to construct a transmission having a hydrostatic type pump as a drive controlling member, with means providing torque supplemental to that of the input torque.

Another object of the invention is to provide a fluid pressure controlled transmission with means to utilize the energy of the fluid flow to provide a torque supplemental to that of the power input torque.

A further object of the invention is to provide a fluid pump controlled transmission with turbine nozzles and blading secured to portions of the transmission for providing a torque thereto that is additive to the power input torque, this being accomplished by utilizing the pump fluid discharge as the source for the nozzles.

Other objects, features, and advantages of the invention will become apparent upon reference to the succeeding, detailed description thereof, and to the drawings illustrating the preferred embodiment thereof; wherein, FIGURE 1 is a cross-sectional view in schematic form of a transmission embodying the invention; and FIGURE 2 is a schematic representation in block diagram form of an illustrative fluid pressure control system for use with the transmission of FIGURE 1.

In general, as described and shown in the above-mentioned U.S. Ser. No. 278,567, the transmission has a power input shaft 10, from which the input torque is divided to two planetary gearsets 12 and 14. The shaft drives the cylinder block 16 of a reversible hydrostatic ball piston type pump 18, which is connected in one torque path by a clutch 20 to gearset 12. The pump has ball piston members 24 cooperating with an eccentrically mounted cam or stroking ring 26. The ring and a pintle 28 are fixed together, the pintle driving the gearset 14 through an intermediate shaft 30.

The pump 18 has fluid inlet ports 32 and fluid output ports 34 (FIGURE 1). The discharge from the pump can be blocked almost completely or completely opened, by control means (FIGURE 2) to be described later. Fully opening the pump outlet permits the pump to operate in a normal manner to rotate the cylinder block without a corresponding rotation of pintle. Blocking the pump outlet almost completely, in effect, locks up the pump for rotation of the cylinder block 16 and stroking ring 26 and pintle 28 as a unit. In normal practice, enough relative rotation of the pump parts is permitted so that sufficient flow is provided to establish a control pressure of a level sufficient to actuate the respective brakes and clutches.

More specifically, FIGURE 1 shows a transmission having a power input shaft 10, which is adapted to be driven by any suitable source of power, such as, for example, the internal combustion engine (not shown) for a motor vehicle. The shaft is formed as an extension of a sleeve shaft integral with the cylinder block 16 of the hydrostatic ball piston pump 18.

The cylinder block is rotatably and sealingly mounted between a stationary casing 36, secured to the transmission housing (not shown), and the pump pintle 28 positioned along the axis of the transmission. The cylinder block is formed with a number of circumferentially spaced pumping bores 38 each receiving a radially movable ball piston pumping member 24. In operation, the ball piston members are held outwardly by centrifugal force against the stroking ring or cam 26, which has an internal surface 40 that is eccentric with respect to the axis of rotation of the cylinder block. The stroking ring also has an annular radial flange 42 fixed to it and to the pintle 28 so that the two constitute a unitary stroking assembly.

The pump unit operates in a known manner. One-half of the ball piston members 24 moves progressively outwardly upon rotation of the cylinder block 16 to draw fluid from a fluid sump 43 (FIGURE 2) through intake passages 44, 46, and 48 in the pintle 28, cylinder block 16, and pump casing 36, respectively. The other half of the ball pumping members are simultaneously forced progressively inwardly by the stroking cam 26 to force the fluid in bores 38 out through discharge passages 50, 52, and 54 in the pintle 28, cylinder block 16, and casing 18. The specific control of the discharge from the pump will be described in more detail later.

As stated, the pintle 28 is fixed to the intermediate shaft 30, to which is splined the sun gear 56 of the rear gearset 14. This gearset is of the simple three-element planetary type having circumferentially spaced planet pinions 58 meshing with the sun gear and a ring gear 60. The planet pinions are rotatably mounted in a carrier 62 formed integral with a power output shaft 64. The ring gear 60 has an axial extension 66 on which is an external brake friction surface for cooperation with a fluid pressure actuated brake band 68 of the wraparound type. A radial torque transmitting flange 70 is splined or otherwise directly connected to the sun gear 72 of the front gearset 12.

Gearset 12 is also of the simple three-element planetary type having circumferentially spaced planet pinions 74 meshing with the sun gear 20 and a ring gear 76. The planet pinions are rotatably supported in a carrier member 78 splined or otherwise secured to carrier 62.

As stated previously, the torque from power input shaft 10 can be split to the gearsets 12 and 14. One path is through the pump 18 to sun gear 56. The other path is from cylinder block 16 through clutch 20 to ring gear 76. To complete this latter path, the cylinder block 16 has splined to it a radially extending annular portion 80, which is connected to the outer drum-like portion 82 of the fluid pressure actuated clutch 20. Portion 80 has a number of circumferentially spaced turbine blades 84 secured to it, for a purpose to be described.

The clutch 20 is of a known fluid pressure actuated, spring release type. It has annular driving friction discs 86 slidably secured to portion 82 and interleaved with similar friction discs 88 slidably secured to the axial extension 90 of ring gear 76.

Portion 90 is also formed with an external friction surface for cooperation with a fluid pressure actuated type reverse brake band 92. The brake is engaged by fluid under pressure from the control system, and is disengaged by a spring (not shown) upon vent of the fluid pressure.

In operation, as thus far described, Neutral is established by disengaging clutch 20 and permitting the free fluid discharge from pump 18. No drive of the stroking assembly 26, 28 and sun gear 56 from the cylinder block 16 is provided, and the gearsets remain stationary.

First or Low speed forward drive is provided by substantially blocking the fluid outlet line 54 to effect rotation of sun gear 56 approximately at the speed of shaft 10. Also, the gearset 14 is conditioned for a reduction drive by applying band 68 to hold ring gear 60 stationary. Forward or clockwise rotation of input shaft 10 in the direction of arrow 94 rotates sun gear 56, causing pinions 58 to walk around within the stationary ring gear 60 to effect a drive of output shaft 64 at a reduced forward speed. The control pressure for actuation of the brake is derived from the hydrostatic pump, as will be described later.

Second or Intermediate speed forward reduction drive is established from Low by subsequently opening or unblocking line 54 to permit pump 18 to operate in a normal manner, and applying clutch 20. The rotation of sun gear 56 is interrupted, since pintle 28 is not driven. Clockwise rotation of input shaft 10 rotates ring gear 76, causing pinions 74 to walk around the stationary sun gear 72 and drive carriers 78 and 62 and output shaft 64 at a reduced forward speed, which is faster than the speed at which output shaft was previously being driven.

A substantially Direct drive from the input to output shafts is established by subsequently releasing band 68, and again substantially blocking the fluid discharge line 54 so as to rotate both sun and ring gears 56 and 76 substantially at engine speed. Both gearsets therefore lock up to provide a unitary drive.

Reverse drive is established by substantially blocking the output line 54, and engaging reverse brake band 92 to hold ring gear 76 stationary. Band 68 and clutch 20 are released. Clockwise rotation of input shaft 10 drives sun gear 56 in the same direction substantially at engine speed. Because of the resistance to rotation of output shaft 64, pinions 58 will rotate in a counterclockwise direction, rotating ring gear 60 and sun gear 72 in the same direction. Pinions 74 therefore rotate clockwise within the stationary ring gear 76, rotating carriers 78 and 62 in a counterclockwise or reverse direction to drive output shaft 64 in the same direction at a reduction in speed from that of input shaft 10.

As mentioned previously, the invention is concerned primarily with increasing the operating efficiency of the transmission by utilizing the fluid discharge from the pump to provide a torque to the system in addition to that provided by the input shaft. As stated, the power input drive cylinder block 16 is connected at all times to the drive side of the clutch 20 by the portion 80, which carries the turbine blades 84. The turbine blades are adapted to cooperate with one or the other of two stationary fluid jet nozzles 96 and 98 spaced 180° apart and facing in opposite directions. As will be described in connection with FIGURE 2, the nozzles are so positioned in the discharge lines of the pump so that one or the other is operative during the drive or coast cycles of the pump. That is, only one nozzle receives fluid at any one time, the other being inoperative.

During the forward drive cycle of pump 18, a portion of the fluid output of the pump passes through the nozzle 96 and strikes one side of the turbine blades 84 to rotate them in the same direction as the drive shaft 10 and cylinder block 16. An acceleration additional to that provided by the input shaft torque is thus imparted to blades 84, resulting in multiplication of the input torque. During a coast cycle of operation of pump, that is, when the output shaft becomes the drive, the inlet and discharge lines 32 and 34 of the pump reverse, and the nozzle 96 becomes inoperative. Pintle 28 then becomes the driving part of the pump, and cylinder block 16 the driven. The nozzle 98 is therefore positioned on the opposite side of the pump from nozzle 96, in what was the inlet but has become the discharge line due to the reversal of lines. The nozzle 98, therefore, now is connected to the pump fluid discharge.

During this stage of operation, engine braking is provided to decelerate the vehicle. If the nozzle 98 discharged fluid in the same direction against turbine blades 84 as does nozzle 96, this supplemental torque would be additive to that provided by the output shaft 64, and, therefore, would reduce the engine braking effect. The nozzle 98, therefore, is positioned, so that discharge of fluid during the coast cycle is in a direction opposing the forward rotation of the blades 84 and cylinder block 16. Thus, the engine braking effect is increased. While two nozzles are provided, it will be clear that more could be used, if desired, so long as a torque is applied to cylinder block 16 that is complementary to that of the input torque, regardless of the direction of rotation of pump 18.

In FIGURE 1, the nozzles are shown as in positions in casing 18 to be supplied with fluid from lines 32 and 34. The blocks 100 and 102 schematically represent control valving that is illustrated in FIGURE 2, and will be described in more detail in connection with that figure.

When pump 18 is operating, therefore, on its drive cycle, the fluid discharged through line 34 is forced through the nozzle 96 to strike the blades 84 and impart additional torque to the system. When the pump operates on its coast cycle, the line 34 becomes the input line from the sump 43 and the line 32 becomes the discharge line. The nozzle 98 then becomes operative to direct fluid against blades 84 to resist or to retard their forward rotation, while nozzle 96 is inoperative.

It should be noted that the fluid requirements of the nozzles are satisfied at all times by the small volume of flow supplying the control system requirements. During first, third, and reverse speed operations, the object is to block the outlet of the pump so that the sun gear is driven at engine speed. The outlet is not completely blocked, however, since a small relative rotation between the pump cylinder block and stroking unit is necessary to satisfy the control system fluid requirements. These requirements, however, are relatively small, and compared to the normal operation of the pump, during these drive ranges, the pump, in effect, is locked up. In these drive ranges, the flow to the nozzles is resultantly low; accordingly, the amount of torque produced by the flow against the turbine blades is also correspondingly small; however, it does provide additional torque during these drive ranges, and increases the efficiency of operation. During intermediate speed operation, the pump outlet is opened wide, thereby directing a large volume of fluid through the nozzles. The torque level added to the system is therefore considerable, and the efficiency is likewise increased.

FIGURE 2 illustrates schematically a typical fluid pressure control system for control of the transmission of FIGURE 1. It automatically and selectively controls the engagements of the respective brakes and clutches and operation of pump 18 to a predetermined schedule to provide the various drives through the transmission.

Before proceeding to a description of FIGURE 2, however, it should be noted that the output shaft 64 drives the rotor 106 of a fluid pump 108 so as to provide a source of fluid under varying pressure supplemental to that provided by the hydrostatic pump 18, as soon as vehicle motion occurs. This can be used for push-starts, and as a supply source for a fluid pressure centrifugal governor 110, also driven by output shaft 64. The governor provides a varying output signal pressure in a line 162 connected to the control system, for automatically shifting the transmission to its different drive ranges with changes in vehicle speed.

The hydrostatic pump 18 is illustrated schematically as being of a reversible type with its cylinder block 16, stroking ring 26 and pintle 28. The pintle has dual sets of interconnected ports 44 and 50 connected respectively to the separate fluid lines 32 and 34 connected to a fluid sump 124 through one-way check valves 112 and 114.

During normal forward driving, clockwise rotation of the cylinder block 16 causes the progressive movement of one-half of the ball piston members 24 radially outwardly by centrifugal force against the stroking ring 26. This draws fluid from the sump 43 past check valve 112 into line 32 and into the connected intake ports 44 in pintle 28, and therefrom into the ball piston bores 38. Simultaneously, the stroking ring 26 is progressively forcing the remaining half of the ball piston members 24 inwardly to displace the fluid previously drawn into their bores 38 out through the pintle discharge ports 50 and into the discharge line 34. The seating of check valve 114 at this time prevents exhaust of the fluid to the sump.

This same combined pumping action occurs during a coast condition when the pintle 28 becomes the driver, and the cylinder block 16 the driven part. The intake and discharge ports thus reverse; that is, check valve 112 closes while valve 114 opens, line 34 becoming an intake line from the sump, with line 32 becoming a discharge line.

The lines 32 and 34 are each connected to one end of a shuttle valve 116 reciprocably controlling a single fluid pressure discharge line 118. Each of the lines also contains a flow blocking or controlling valve 120, 122 and a nozzle 96, 98. Since the operation and construction of the nozzle and blocking valve in each line 32 or 34 are identical, only the ones for line 32 will be described. Line 32 is connected to the midpoint of a valve bore 124, in which is slidably movable a valve 120 having a single spool. The valve is spring-biased to one end, to connect line 32 to a line 128 containing an orifice 130. The valve 120 is moved against the spring 132 by fluid under pressure from a line 164 to block line 128 and connect line 32 to an unrestricted line 136. The portion of line 128 downstream of orifice 130, and line 136 have a common feed to the fluid control system line 138 leading to the shuttle valve 116. A branch line 140 supplies flow to the nozzle 96.

During Low and Direct and Reverse drives, considerable torque is necessary to rotate the sun gear 56 from a standstill. Quite a high reaction pressure therefore is needed to keep the pump 18 locked up; that is, to keep the ball valve members 24 from reciprocating more than is necessary to provide only the control system fluid requirements.

The orifice 130 reduces the high pressure fluid in line 32 down to a convenient operating level that is commensurate with the torque capacities of the various clutches and brakes 20, 68 and 92 establishing the different drive conditions. This permits the use of low pressure parts and effects smoother shifts. The nozzle orifice on the other hand maintains the line 138 filled with fluid and at or above a minimum pressure.

During Intermediate speed, when it is desired to unblock the pump outlet 34 to stop rotation of sun gear 56, valve 120 is moved up by pressure in line 164 from a 1–2 shift valve (to be described) to connect lines 32 and 136. Thus, a considerable flow of fluid is discharged into line 138 and through the nozzle 96, by passing orifice 130. The supplemental torque to cylinder block 16 by the rotation of the turbine blades 84 is therefore increased considerably.

The control system has a number of control valves and elements, including a throttle pressure valve 142, a combination line pressure regulator and check valve 144, a manually operated drive range selector valve 146, a rear fluid pump 108, a governor 110, a first-to-second speed shift valve 148, and a second-to-third speed shift valve 150.

The fluid under pressure in line 118 passes to the valve 144. This valve is of a known type of combination line pressure regulator and check valve. The regulating portion of the valve usually is spring biased to a closed position, and when opened by the attainment of the desired pressure, vents excess fluid to the sump through a line 152. It regulates the pressure level of the fluid in the main line 118 from the shuttle valve in accordance with changes in torque demand, as sensed at one end by a throttle valve pressure acting thereon in a line 154.

The regulator valve 144 also includes a check valve element, not shown, in the line 157 from the rear pump 108 to prevent the fluid in line 118 from being exhausted to the sump through the rear pump when this latter pump is inoperative. At the same time, the check valve permits the rear pump to supply the system with operating fluid when the hydrostatic pump 18 is inoperative, such as during a push-start or coasting start of a stalled engine.

The throttle valve 142 provides a metered throttle valve pressure, hereinafter referred to as TV pressure, that varies as a function of the changes in vacuum in the vehicle engine intake manifold. It variably meters mainline fluid pressure from the line 118 to a line 154. The valve is connected to a vacuum dashpot 156 of a known spring opening-vacuum closing type. At full vacuum, indicative of a vehicle closed throttle condition, the throttle valve is closed, and no control pressure is supplied to line 154. As the vacuum in the intake manifold progressively changes, for the same opened throttle settings, a progressively increasing TV control pressure will be supplied through line 154 to act on the pressure regulating valve 144, as well as the shift valves to be described, to control their actions as a function of the engine torque demand. Thus, the mainline pressure in line 118 is changed to provide an engaging pressure for the clutch 20 and brakes 68 and 92 corresponding to the torque capacity required.

Valve 146 is a manually operable drive range selector valve movable to the left or right to a plurality of positions, such as Reverse, Neutral, Drive Range, and Manual Low, as indicated by the corresponding indicia. It selectively establishes the different driving operations of the transmission by connecting mainline pressure in line 118 to the respectve clutches and/or brakes. It has (1) a Reverse drive range position supplying mainline pressure directly through line 158 to the servo for the reverse brake 92; (2) a drive Neutral position preventing engaging pressure from being supplied to any of the clutches or brakes; (3) a Drive range position permitting automatic operation by supplying mainline pressure to the shift valves so that they can supply the clutch and brake servos when they shift to change from a low speed to an intermediate speed range, and therefrom to a direct drive; and (4) a manual Low drive range position supplying mainline pressure through line 160 directly to the servo for the low and intermediate brake 68.

The governor 110, as described in connection with FIGURE 1, receives a fluid supply from the rear pump 108 through line 156, and regulates the pressure of this fluid in one or more stages as desired, to provide an output signal pressure in line 162 varying with changes in vehicle speed.

The first-to-second speed and second-to-third speed shift valves 148 and 150, thereinafter referred to as the 1–2 and 2–3 shift valves, are spring biased to down-shifted positions, and move to upshifted positions under the opposing forces of governor pressure and TV pressure applied to opposite ends of the valves through lines 162 and 154, respectively, to condition the transmission for the different drive ranges.

The flow blocking valves 120, 122 are adapted to be moved to unblocking positions by mainline fluid pressure in a line 164 supplied through the 2–3 shift valve 150 from the 1–2 shift valve 148 when the latter valve moves to its second speed position. This movement then connects line 32 directly to line 138 permitting normal operation of the pump. The pump cylinder block 16 then rotates without rotating the stroking assembly 26, 28. It should be noted, that, while the valves 120, 122 have been shown as having only two positions, they could have a plurality of positions to connect line 32 with lines each having an orificed opening of a different size, or orifice 130 could be a variable area orifice, so as to permit the variable blocking of the pump discharge to effect a progressive or other rotation of sun gear 56 at any number of varying speed ratios.

In operation of the control system, assuming the vehicle is at a standstill, the rear pump 108 and governor 110 are inoperative, and the manual valve 146 is in its neutral position. This blocks any flow of fluid from the hydrostatic pump to the servos for the respective clutch 20 and brakes 68 and 92, and, therefore, conditions the transmission for a neutral operation.

To establish Low speed forward drive range, the manual valve is positioned to connect the drive range line 166 with mainline pressure in line 118. The shift valves 148 and 150, and blocker valves 120, 122 are spring biased to the positions indicated. Mainline pressure is therefore supplied through line 166a, through the 1–2 and 2–3 shift valves 148 and 152 to the servo for the low and intermediate brake to apply brake band 68. The transmission is thus conditioned for Low speed forward reduction drive operation. The orifice 130 substantially blocks pump output line 32 except for the small flow bled through the orifice to satisfy line pressure and nozzle requirements. The pump elements therefore rotate substantially as a unit, with the fluid drive of the turbine blades 84 imparting additional torque to the cylinder block 16 to accelerate it. Sun gear 56 is therefore driven substantially at engine speed. Clockwise rotation of input shaft 10 (FIGURE 2) now drives sun gear 56 forwardly, rotating pinions 58 in a counterclockwise direction. The pinions are thus forced to walk around within the stationary ring gear 60 to drive carrier 62 and output shaft 64 in a forward direction at a speed reduced from that of the input shaft.

When the force of the governor pressure in line 162 acting on the 1–2 shift valve 148 overcomes the combined forces of the spring and TV pressure in line 154 acting thereon, the valve shifts to the left. This connects lines 166 and 164 while maintaining the low and intermediate brake 68 engaged by the elongated ports 168 in the 1–2 shift valve. At this time, therefore, the blocker valves 120, 122 are acted upon by mainline pressure in line 164 passing through the 2–3 shift valve, and is moved to connect line 32 to the unrestricted line 136. The hydrostatic pump 18 then operates solely as a pump, supplying all the fluid output to line 138 and nozzle 96. A considerable supplemental torque thus is imparted to the cylinder block. Sun gear 56 at this time remains substantially stationary, i.e., substantially no torque is being applied to the sun gear.

Simultaneously, the upshifted 1–2 valve 148 supplies the servo for the intermediate and high speed clutch 20 with engaging fluid pressure through a line 170 branched from line 164, so that the forward gearset 12 is now conditioned for a reduction drive. Clockwise rotation of input shaft 10 now drives ring gear 76 in the same direction causing pinions 74 to walk around the stationary sun gear 72 in a clockwise direction. The carrier 78 and output shaft 64 are therefore driven in the same direction and at a speed reduced from that of the input shaft. This speed ratio is greater than that established during low speed operation.

Continued increase in speed of rotation of the output shaft increases the governor pressure in line 162 acting on the 2–3 shift valve. When this pressure reaches a level in excess of the spring force and TV pressure acting on the valve, the valve then moves to its upshifted position. In this position, the valve cuts off the supply of engaging pressure to the servo for the low and intermediate brake 68, and the brake servo is vented to exhaust. Also, the supply of actuating pressure to the blocker valves 120, 122 through line 164 is terminated, permitting these valves to be spring returned to the positions shown. Line 32 again effectively becomes blocked, except for the small flow through the orifice and nozzle, resulting effectively, in a lockup of the pump 18 and rotation of sun gear 56 approximately at the speed of power input shaft 10. The intermediate and high speed clutch 20 remains engaged due to its separate supply through line 170 from the 1–2 shift valve 148.

Thus, the ring gear 76 of gearset 12 and sun gear 56 of gearset 14 are both driven substantially at engine speed. Both gearsets are therefore locked up to provide a direct-drive from the power input shaft 10 to the power output shaft 64. It will be clear, of course, that the valve land areas and spring forces acting on the shift valves are such as to provide the progressive movement as described. Delayed upshifts, of course, are caused by increases in the TV pressure in line 154 with increased throttle opening movements of the vehicle accelerator pedal decreasing the vacuum.

If the vehicle coasts during any of the drives described, then the coast cycle of the pump becomes operative to supply nozzle 98 with fluid to apply a torque to blades 84 resisting their forward rotation. This torque, therefore, is an auxiliary braking torque complementary to that provided by the resistance of the engine shaft 10 to being driven by the output shaft faster than by the engine.

Automatic coast downshifts from direct drive to intermediate and low speed drives will occur upon reduction in the vehicle speed. This results in a reduction in the governor pressure acting in line 162 on the shift valves 148 and 150. Thus, the shift valves will progressively downshift to establish the respective drive ranges called for by the speed conditions indicated. TV pressure in line 154 is zero The 2–3 shift valve will therefore downshift at a predetermined speed, when spring force overcomes governor pressure, to establish intermediate speed drive range. Likewise, subsequently, at the predetermined speed, the 1–2 shift valve will downshift to establish low speed operation.

Forced throttle downshifts below predetermined maximum vehicle speeds can also be made by moving the engine throttle to a wide open or partially open position. This decreases the intake manifold vacuum, effecting an increase in TV pressure in line 154 acting on the shift valves. If the governor pressure at this time is below the critical vehicle speed value, and less than the combined spring and TV pressure forces, the shift valves will downshift in sequence to establish the different reduction drives. It is to be noted that the areas of the shift valves against which the governor and throttle pressures act will also be calibrated so as to provide a hysteresis effect; i.e., the downshift will occur at different vehicle speeds than the upshifts.

A manually Low drive range is established by positioning the selector valve to that position. This connects mainline pressure in line 118 to line 160 leading directly to the servo for the low and intermediate brake 68. Since the pressure blocking valves 120, 122 maintain the hydrostatic pump substantially in a locked up condition, the sun gear 56 will be driven substantially at engine speed. With brake band 68 applied, the transmission will be permanently conditioned for low speed operation. No mainline fluid pressure is supplied to line 166, so that no actuating pressure to clutch 20 is available. Therefore, no upshifts to other drive ranges occur.

A Reverse drive is established by moving the manual valve to that position, which connects line pressure in line 118 to the reverse line 158. This effects engagement of the reverse brake 92 to hold ring gear 76 stationary and condition the transmission for a reverse drive. Blocking valve 120, 122 maintain the pump substantially in a lockup condition thereby causing sun gear 56 to be driven in a clockwise direction substantially at engine speed. Due to the initial resistance to rotation of output shaft 64 and carriers 62 and 78, the planet pinions 58 will rotate in a counterclockwise direction. This drives ring gear 60 and sun gear 72 in the same direction, rotating pinions 74 in a clockwise direction. With ring gear 76 stationary, the pinions 74 are forced to walk around in a counterclockwise or reverse direction, thereby driving the carriers 78 and 62 and output shaft 64 in the same direction and at a speed reduced from that of input shaft 10. The rear pump 108 is inoperative during this drive range. The governor 110 therefore provides no pressure to the shift valves 148 and 150, and no upshift to a different speed range occurs. Push-starts, or coast starts of stalled engines, are obtained by the rear pump supplying the system with fluid under pressure through the regulator valve 144. The respective brake and clutch servos are therefore engaged completing a torque path to crank the engine. The pump 18 will then assume the fluid supply for the control system requirements.

From the foregoing, it will be seen that the invention provides auxiliary driving torque to the transmission during normal forward drive operation, and auxiliary braking assistance during a coast condition when the direction of torque application reverses. The transmission thus operates more efficiently. The invention uses to advantage the otherwise wasted fluid discharge from a pump forming a driving connection in the transmission.

While the invention has been illustrated in its preferred embodiment, it will be clear to those skilled in the arts to which the invention pertains that many changes and modifications may be made thereto without departing from the scope of the invention.

I claim:
1. A transmission having power input and output shafts, and gear means connecting said shafts providing a drive therebetween, said gear means having a plurality of drive members and driven and reaction members, means operably connecting said drive and driven members to said input and output shafts respectively, and means in said connections for variably controlling the drive to said drive members, said latter means comprising hydraulic pump means having relatively rotatable drive and reaction elements operably connected respectively to said input shaft and one of said drive members and having a fluid outlet capable of being opened or variably closed to vary the differential speed of rotation between said elements, means for connecting said drive element to another of said drive members to provide a different drive through said transmission, and means responsive to the fluid pressure output of said pump means for imparting a torque to said drive element supplemental to the torque input thereto by said input shaft.

2. A transmisison having power input and output shafts, and gear means connecting said shafts providing a drive therebetween, said gear means having a plurality of drive members and driven and reaction members, means operably connecting said drive and driven members to said input and output shafts respectively, and means in said connections for variably controlling the drive to said drive members, said latter means comprising hydraulic pump means having relatively rotatable drive and reaction elements operably connected respectively to said input shaft and one of said drive members and having a fluid outlet capable of being opened or variably closed to vary the differential speed of rotation between said elements, means for connecting said drive element to another of said drive members to provide a different drive through said transmission, and turbine means secured to said drive element and responsive to the fluid pressure output of said pump means directed thereagainst for imparting a torque to said drive element supplemental to the torque transmitted thereto by said input shaft.

3. A transmission having power input and output shafts, and gear means connecting said shafts providing a drive therebetween, said gear means having a plurality of drive members and driven and reaction members, means operably connecting said drive and driven members to said input and output shafts respectively, and means in said connections for variably controlling the drive to said drive members, said latter means comprising hydraulic pump means having relatively rotatable drive and reaction elements operably connected respectively to said input shaft and one of said drive members and having a fluid outlet capable of being opened or variably closed to vary the differential speed of rotation between said elements, means for connecting said drive element to another of said drive members to provide a different drive through said transmission, fluid nozzle means connected to the outlet of said pump means for discharging fluid therethrough, and turbine means secured to said drive element and positioned in the path of discharge of fluid through said nozzle means, said turbine means being responsive to the fluid pressure flow through said nozzle means for imparting a torque to said drive element supplemental to the torque input thereto by said input shaft.

4. A transmission having power input and output shafts, and gear means connecting said shafts providing a drive therebetween, said gear means having a plurality of drive members and driven and reaction members, means operably connecting said drive and driven members to said input and output shafts respectively, and means in said connections for variably controlling the drive to said drive members, said latter means comprising hydraulic pump means having relatively rotatable drive and reaction elements operably connected respectively to said input shaft and one of said drive members and having a fluid outlet capable of being opened or variably closed to vary the differential speed of rotation between said elements, selectively operable clutch means for connecting said drive element to another of said drive members to provide a different drive through said transmission, the substantially closed condition of said outlet rotating said pump means elements substantially as a unit providing one drive range of operation of said transmission, the opening of said outlet and engagement of said clutch means providing a second driving range of operation, and means responsive to the fluid pressure output of said pump means for imparting a torque to said drive element supplemental to the torque input thereto by said input shaft.

5. A transmission having power input and output shafts, and gear means connecting said shafts providing a drive therebetween, said gear means having a plurality of drive members and driven and reaction members, means operably connecting said drive and driven members to said input and output shafts respectively, and means in said connections for variably controlling the drive to said drive members, said latter means comprising hydraulic pump means having relatively rotatable drive and reaction elements operably connected respectively to said input shaft and one of said drive members and having a fluid outlet capable of being opened or variably closed to vary the differential speed of rotation between said elements, selectively operable clutch means for connecting said drive element to another of said drive members to provide a different drive through said transmission, the substantially closed condition of said outlet rotating said pump means elements substantially as a unit providing one drive range of operation of said transmission, the opening of said outlet and engagement of said clutch means providing a second driving range of operation, and turbine means secured to said drive element and responsive to the fluid pressure output of said pump means directed thereagainst for imparting a torque to said drive element supplemental to the torque transmitted thereto by said input shaft.

6. A transmission having power input and output shafts, and gear means connecting said shafts providing a drive therebetween, said gear means having a plurality of drive members and driven and reaction members, means operably connecting said drive and driven members to said input and output shafts respectively, and means in said connections for variably controlling the drive to said drive members, said latter means comprising hydraulic pump means having relatively rotatable drive and reaction elements operably connected respectively to said input shaft and one of said drive members and having a fluid outlet capable of being opened or variably closed to vary the differential speed of rotation between said elements, selectively operable clutch means for connecting said drive element to another of said drive members to provide a different drive through said transmission, the substantially closed condition of said outlet rotating said pump means elements substantially as a unit providing one drive range of operation of said transmission, the opening of said outlet and engagement of said clutch means providing a second driving range of operation, fluid nozzle means connected to the fluid output of said pump means for discharging fluid therethrough, and turbine means secured to said drive element and positioned in the path of discharge of fluid through said nozzle, said turbine means being responsive to the fluid pressure flow through said nozzle for imparting a torque to said drive element supplemental to the torque input thereto by said input shaft.

References Cited by the Examiner
UNITED STATES PATENTS

| | | | |
|---|---|---|---|
| 1,062,876 | 5/1913 | Blymyer | 74—732 |
| 1,474,007 | 11/1923 | Sides et al. | 60—54 |
| 1,901,265 | 3/1933 | Schneider | 74—732 |
| 1,952,354 | 3/1934 | Bedford | 60—54 |
| 1,972,602 | 9/1934 | Robbins | 60—54 |
| 2,502,364 | 3/1950 | Bannister | 60—54 |
| 2,511,518 | 5/1950 | Stephens | 192—60 |
| 3,159,051 | 12/1964 | Herndon et al. | 74—645 |

DAVID J. WILLIAMOWSKY, *Primary Examiner.*

THOMAS C. PERRY, *Examiner.*